United States Patent [19]

Marquis et al.

[11] 4,180,644
[45] Dec. 25, 1979

[54] POLYURETHANE CHAIN-EXTENDERS

[75] Inventors: Edward T. Marquis; Ernest L. Yeakey, both of Austin, Tex.

[73] Assignee: Texaco Development Corp., White Plains, N.Y.

[21] Appl. No.: 929,756

[22] Filed: Jul. 31, 1978

[51] Int. Cl.$^2$ ............................................. C08G 18/32
[52] U.S. Cl. ................................ 528/68; 260/551 R
[58] Field of Search ........................................ 528/68

[56] References Cited

U.S. PATENT DOCUMENTS 4,016,143  4/1977  Blahak et al. .................... 528/68

*Primary Examiner*—Maurice J. Welsh
*Attorney, Agent, or Firm*—Carl G. Ries; Thomas H. Whaley; James L. Bailey

[57] ABSTRACT

Covers certain aromatic-amine amides which comprise the reaction product of an alkylene polyoxypropylene diamine, triamine, or tetramine and an isatoic anhydride of the formula:

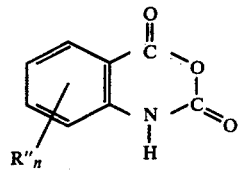

where R" is selected from the group consisting of hydrogen, alkyl, nitro, halo, hydroxy, amino, and cyano, and n is a number of 1–4. Also covers the use of said compounds as chain-extenders in polyurethane compositions. Such chain-extenders provide for the production of polyurethane elastomers having improved tensile strength, tear strength and elongation properties.

2 Claims, No Drawings

POLYURETHANE CHAIN-EXTENDERS

BACKGROUND OF THE INVENTION

When an organic polyisocyanate is reacted with a polyether polyol to produce a polyurethane composition, various components are introduced into the system in order to adjust the physical properties of the resulting polyurethane composition. For example, if a cellular product is desired, water or an appropriate blowing agent is added to the polyurethane reaction mixture. In order to adjust properties of various polyurethane compositions such as the tensile strength, elongation, tear strength, flexibility, the softness or hardness of the resulting composition, or the color, various other additives are used. Often the addition of an additive to improve one particular property results in the degradation of other properties of the polyurethane composition. For instance, an additive which increases the tensile strength of a solid polyurethane composition such as various fillers may result in a decrease in the elongation of the resulting polyurethane composition. Therefore, it is necessary to achieve a balance of properties for a given use.

Solid polyurethane compositions have found usefulness in gaskets, sealants, floor coverings, and the like. More recently, with the advent of molded, rigid plastics, it has become desirable to provide a flexible polyurethane mold for use in the place of the more expensive silicone-type molds currently being used. In order for a polyurethane composition to be acceptable for this use, it must be soft and flexible, yet have good tensile and tear strength so that the mold does not become unusable after a short period of time due to tears or splits in the mold material. Heretofore, polyurethane compositions have not been acceptable for this purpose.

Polyurethane compositions generally in use as floor coverings are systems dissolved in a solvent which are moisture-cured by the atmosphere after application on the floor. These floor coatings have been found to suffer considerably from "bleed through", especially when placed on a substrate which had previously been covered with some other type of floor covering. While there are some single component floor coatings (i.e., solvent types), these have been found to be lacking in one or more of the desired properties for an acceptable floor coating. To be an acceptable floor covering composition, it is desirable that the elastomer be strong, scuff-resistant and yet flexible enough to conform to shifts in the floor.

With the widespread use of foam crash pads in automobiles and the like, it has become desirable to develop a crash pad with a tough scuff-resistant skin which is integral to the foam of the crash pad itself. Previously, it was necessary to line the mold in which the crash pad was to be cast with a decorative coating such as vinyl and the like in order to achieve the strength and scuff-resistance necessary for the pad, and yet maintain an attractive appearance of the crash pad itself. Previous attempts at producing a polyurethane foam crash pad having an integral skin which would meet these qualifications have met with considerable difficulty and disappointing results.

The advantages and objects of our invention will be apparent to those skilled in the art, in view of the aforementioned background, the following discussion and accompanying examples.

SUMMARY OF THE INVENTION

This invention relates to aromatic amine-amide compositions which comprise a reaction product of an alkylene polyoxypropylene diamine, triamine or tetramine and an isatoic anhydride of the formula:

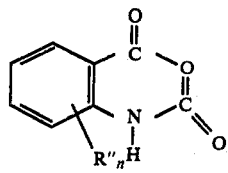

where $R''$ is selected from the group consisting of hydrogen, alkyl, nitro, halo, hydroxy, amino, and cyano, and n is a number of 1–4.

The invention also relates to the production of polyurethane compositions having improved physical properties due to presence of the above compounds which act as chain-extenders.

The chain-extender of the invention is incorporated into the reaction mixture of an organic isocyanate and an organic polymeric polyhydroxy compound such as polyester or polyether polyols used for the production of polyurethane compositions, along with a urethane catalyst and various additives frequently used in the polyurethane art.

DETAILED DESCRIPTION OF THE INVENTION

Particularly preferred chain extenders have the following structural formula:

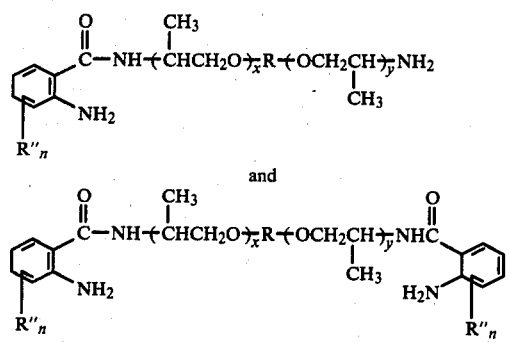

where R is $-(CH_2)_r-$, or $-(CH_2)_r[O-(CH_2)_s]_z(CH_2)_t-$ where $R'$ is selected from a group consisting of hydrogen, alkyl, nitro, halo, hydroxy and cyano and n is a number of from 1 to 4, x and y are numbers from 1 to 10, r, s, and t, are number of from 1 to 6 and z is a number from 4 to 50.

In order to prepare the above compounds an isatoic anhydride of the formula:

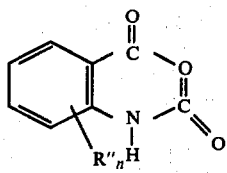

where $R'$ is selected from the group consisting of hydrogen, alkyl, nitro, halo, hydroxy, and cyano and n is a number of from 1 to 4, is reacted with an alkylene polyoxypropylene diamine, triamine or tetramine. The isatoic anhydrides are well known materials, and their preparation need not be discussed in detail. A preferred reactant is isatoic anhydride itself, where R' is H.

Preferred amine reactants are diamines and triamines.

$$H\text{-}(O\text{---}CH_2CH_2CH_2CH_2)_z\text{OH}$$

where z is an average number ranging from about 6 to about 50, and propoxylating said polybutanediol with sufficient propylene oxide to provide an adduct having the structure:

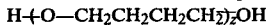

where x and y range from 1 to 8.

A preferred alkylene polyoxypropylene diamine reactant has the following formula then:

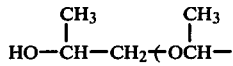

where R is $\text{-}(CH_2)_r\text{-}$ or $\text{-}(CH_2)_r[O\text{-}(CH_2)_s]_t(CH_2)_t\text{-}$ x and y being numbers from 1 to 10, r, s, and t, being numbers of from 1 to 6 and z being a number of from 4 to 50.

A preferred alkylene polyoxypropylene triamine reactant has the following general structure:

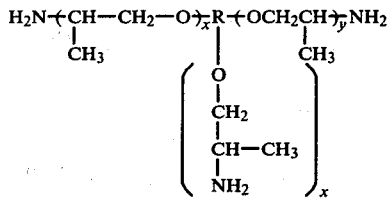

where x and y are numbers from 1 to 10 and R is an alkyl or aryl residue. Typical compounds would include the propyleneoxide adducts of 1,2,6-hexane triol and pentaerythritol which are then aminated.

The above amines are well-known materials and can be made by a wide variety of techniques. One excellent technique of preparing the diamines is to first provide the corresponding diol compound, such as 1,6-hexanediol. This compound in turn is propoxylated with sufficient propylene oxide to provide an adduct thereof. This adduct in turn is then reacted with ammonia or ammonium hydroxide in presence of a suitable reductive amination catalyst to produce the desired diamine.

The same type of sequence of reactions may be carried out to prepare the diamines from propoxylated lower alkyleneglycols. That is, a polyoxy lower alkylenedoil of the formula:

where r, s, t and z are as above is first reacted with propylene oxide. This adduct in turn is then reductively aminated as set out above. Again, starting diols of the above type which can be propoxylated are commercially available, and need little elaboration. For example, typical useful starting material of this type is a polyoxybutylene diol sold under the trademark POLY-MEG ® 1000 by Quaker Oats Co. This particular material has an average molecular weight of approximately 1000.

As a typical example, the first step involves providing as a starting reactant, for example, a polyoxybutylene diol having the following structural formula:

The propoxylation reaction can be conducted using conventional methods and conditions such as temperatures in the range of about 40° to about 200° C. and pressures from about 0 to about 100 psig. Usually the reaction occurs under basic conditions established through the use of alkali metals, their hydroxides, oxides, and hydrides and in some cases basic amines. Representative alkoxylation procedures which may be followed here are described in the following reference: Martin J. Schick, Ed. "Nonionic Surfactants," Marcel Dekker Inc., New York, N.Y. 1967, pp. 187–204.

The propylene oxide adduct is then reacted with ammonia or ammonium hydroxide in presence of a suitable reductive amination catalyst to produce the desired polymeric amine. A wide number of known catalysts of this type are useful here. Preferred are nickel and cobalt-based catalysts with the most preferred being a nickel-based catalyst, including Raney nickel and nickel in combination with other metals or oxides of metals.

The above-described propylene oxide adducts are reacted with ammonia or ammonium hydroxide (preferably ammonia) in the presence of said hydrogenation-dehydrogenation catalyst at elevated temperatures in the presence of hydrogen to form the amines. Suitable reactors include either a closed autoclave resulting in a batch process or a tubular reactor which can be operated in a continuous manner.

As just noted the class of useful catalysts here is well known and may include one or more metals including copper, nickel, cobalt, chromium, aluminum, manganese, platinum, palladium and rhodium and the oxides of these metals. The metals or their oxides may be employed in combination with normally nonreducible metal oxides such as chromium oxide, molybdenum oxide and manganese oxide. The amount of the nonreducible oxide employed may be varied considerably and some catalysts, notably those based upon cobalt require the presence of no nonreducible metal oxides.

One preferred catalyst that is very effective for the amination reaction, includes the metals or oxides of nickel, cobalt and chromium. A particularly satisfactory catalyst is one in which the active ingredients consist essentially, in mole percentages on an oxide-free basis of 60–85 percent nickel, 14–37 percent copper and 1–5 percent chromium, as produced in accordance with procedures described in U.S. Pat. No. 3,152,998. As used herein this catalyst will be referred to as a nickel-copper-chromium catalyst.

The reductive amination reaction is carried out from 160° to 250° C. The reaction pressures are from 750 to about 4000 psig with a hydrogen partial pressure of at least 200 psig. The preferred pressure range is from about 1000 to about 2500 psig and a hydrogen partial pressure from about 200 to about 2000 psig.

The residence times in the reactor to be used to produce the amine reactants are those which would occur at space velocities of about 0.2 to about 3.0 weight of reactants per volume of catalyst per hour, with the preferred space velocity being from about 1.0 to about 2.0. The space velocity herein described is in g total liquid feed/ml of catalyst/hour, but rates in equivalent units are equally applicable.

The ratio of reactants, i.e., propylene oxide adduct and ammonia can vary over a wide range to produce the amines. The preferred ratio of ammonia to adduct is 10–100 moles ammonia/mole adduct.

By following the above-discussed techniques of the invention substantially all of the hydroxyl groups of the propylene oxide adduct are transformed into primary amine groups.

In order to make the products of the invention, the above amine and isatoic anhydride reactants are simply mixed together without necessity of solvent or diluent and heated. When the reaction is finished, the product requires no further treatment or purification. In addition, no catalyst is necessary to effect the reaction. The products are generally viscous liquids (pourable when warm) rather than crystalline solids. The temperature of reaction may range from about 20° C. to about 200° C. at a pressure ranging from atmospheric pressure to about 1000 psig.

When one mole of the isatoic anhydride is added per mole of diamine only one of the terminal amine groups is reacted to produce a monoamide containing one aromatic and one aliphatic amine group. On the other hand if two moles of the anhydride are reacted with one mole of the diamine both terminal groups are reacted to produce a diamide structure containing two aromatic amine groups.

Typical triamines and tetramines of the inventions have the following structures:

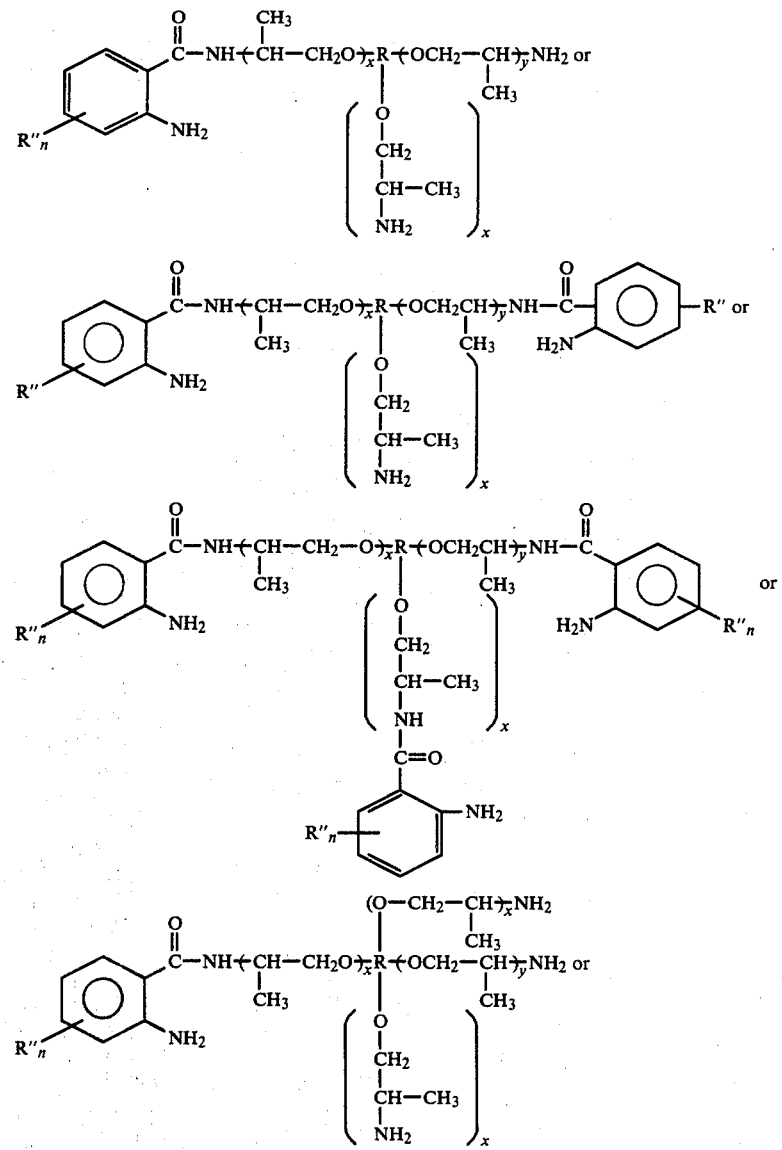

-continued

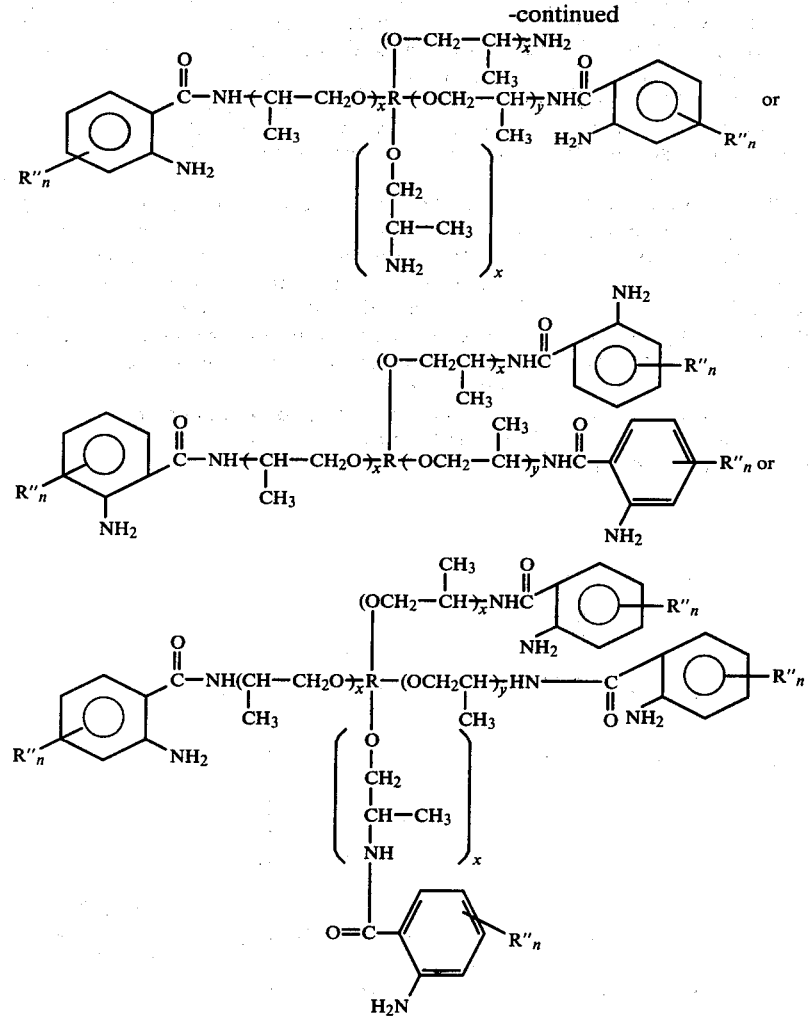

The above chain-extenders are particularly useful in preparing improved solid polyurethane compositions useful as sealants, floor coatings and molds. In addition, when employing the additives of the invention one may provide an integral skin on a foamed cellular polyurethane composition containing the chain-extenders of the invention. This integral skinned cellular polyurethane composition produces a product having the desired properties of a foam crash pad in addition to having a tough, scuff-resistant integral skin, thus, obviating the necessity of lining the mold with a separate skinning material.

As noted above in the production of polyurethane compositions, polymeric polyhydroxy compounds such as polyester or polyether polyols are reacted with organic polyisocyanates to produce a polyurethane composition. Polyether polyols are described herein, and polyester polyols are described in U.S. Pat. No. 3,391,093 for example. This reaction usually occurs in the presence of a catalyst but may occur noncatalytically when a polyol containing tertiary nitrogen atom is used. In the practice of the invention, the above-described chain-extenders are included in this reaction mixture to produce improved polyurethane compositions. When a solid polyurethane composition is produced using the chain-extender of the invention, we have discovered that improved tensile strength, tear strength and elongation results. With the chain-extender of our invention, strong yet flexible floor coverings and sealants are possible. In addition, soft, flexible molds can be produced which have improved tear strength but yet have sufficient compression strength to withstand pressures produced when the mold made from our polyurethane composition must contain an expanding cellular plastic.

Suitable organic polyisocyanates useful in the practice of our invention are those organic diisocyanates, triisocyanates and polyisocyanates well-known in the polyurethane art. Mixed isomers of toluene diisocyanate which are readily commercially available such as those described in U.S. Pat. No. 3,298,976 and the like may be used. Especially preferred are diisocyanates and polyisocyanates prepared by the phosgenation of the reaction product between aniline and formaldehyde such as 4,4'-diphenylmethane diisocyanate, 2,4'-diphenylmethane diisocyanate and higher functionality polyphenylmethylene polyisocyanates, hereinafter called polyarylpolyisocyanates. Especially preferred organic polyisocyanates for forming solid polyurethane compositions are diphenylmethane diisocyanate and modified diphenylmethane diisocyanates sold under the trademark of ISONATE® 143L. Polyarylpolyisocyanates which are used in the practice of our invention, particularly to produce cellular polyurethanes, have a functionality of from about 2.0 to about 3.3. An especially preferred functionality range is from about 2.2 to about 2.9.

Polyether polyols useful in the practice of our invention are those diols, triols, tetrols and mixtures thereof having a molecular weight from about 500 to about 10,000. The diols are generally polyalkylene ether glycols such as polypropylene ether glycol, polybutylene ether glycol, and the like, and mixtures thereof. Mixed polyether polyols can also be used such as the condensation products of an alkylene oxide with a polyhydric alcohol having three or four primary hydroxyl groups such as glycerol, trimethylolpropane, 1,2,6-hexanetriol, pentaerythritol, and the like. These polyether polyols are well-known and may be prepared by any known process such as, for example, the processes discussed in Encyclopedia of Chemical Technology, volume 7, pages 257-262, published by Interscience Publishers, Inc. in 1951.

As mentioned above, any suitable polyhydric polyalkylene ether may be used, such as, for example, the condensation product of an alkylene oxide with a polyhydric alcohol. Any suitable polyhydric alcohol may be used such as, for example, ethylene glycol, 1,2-propylene glycol, 1,3-propylene glycol, 1,4-butylene glycol, 1,3-butylene glycol, glycerine, trimethylolpropane, 1,2,6-hexanetriol, pentaerythritol, and the like. Any suitable alkylene oxide may be used such as, for example, ethylene oxide, propylene oxide, butylene oxide, amylene oxide, their various isomers, and the like. Of course, the polyhydric polyalkylene ether polyols can be prepared from other starting materials such as, for example, tetrahydrofuran, epihalohydrin, aralkylene oxides such as, for example, styrene oxide, and the like. Polyhydric polyether polyols having three or four hydroxyl groups per molecule and a molecular weight of from about 2,000 to about 10,000 can be used. The polyol used can be a blend of diols with triols or tetrols to produce a polyol blend having an average molecular weight of from about 500 to about 10,000. Blended diols and triols for use in solid polyurethane elastomers are generally discussed in U.S. Pat. No. 3,391,101. Most preferred for use either alone or blended with a diol are the polyoxyalkylene triols and tetrols having a molecular weight of from about 2,000 to about 7,000.

The polyether polyols may have primary or secondary hydroxyl group termination. When the polyhydric alcohol is reacted with an alkylene oxide such as propylene oxide, butylene oxide, and the like, the terminal groups are predominantly secondary hydroxyl groups. However, it is within the scope of our invention to use polyether triols or polyether tetrols which have from about 5 to about 15 wt. % ethylene oxide added thereto in a final alkoxylation step by the known alkoxylation processes in order to increase the terminal primary hydroxyl content of the said polyether polyol. The manufacture of ethylene oxide "tipped" polyether polyols is generally discussed in U.S. Pat. No. 3,336,242.

As hereinbefore mentioned, the polyether polyol and the organic polyisocyanate are reacted to form the polyurethane composition. This reaction may occur noncatalytically when a polyol is used which contains tertiary nitrogen compounds or may be carried out in the presence of known polyurethane catalysts. The use of a separate catalyst is preferred. The catalyst employed may be any of the catalysts known to be useful for this purpose, including tertiary amines and metallic salts. Suitable tertiary amines include N-methylmorpholine, N-ethylmorpholine, triethylenediamine, triethylamine, trimethylamine and N-dimethylethanolamine. Typical metallic salts include, for example, the salts of antimony, tin, mercury and iron; for example, dibutyltin dilaurate phenylmercuric acetate and stannous octoate. The catalyst is usually employed in a proportion of from about 0.01% to 2% by weight based on the weight of the overall composition.

Various additives can be employed to provide different properties, e.g., fillers such as clay, calcium carbonate, talc, or titanium dioxide. Dyes and pigments may be added for color and anti-oxidants also may be used.

When the embodiment of our invention is practiced which involves the production of the self-skinning cellular polyurethane product, a foaming agent is employed which may be any of those known to be useful for this purpose such as water, the halogenated hydrocarbons, and mixtures thereof. Typical halogenated hydrocarbons include but are not limited to monofluorotrichloromethane, difluorodichloromethane, 1,1,2-trichloro-1, 1,2-fluoroethane methylene chloride, and the like. The amount of foaming agent employed may be varied within a wide range. Generally, however, the halogenated hydrocarbons are employed in an amount from 1 to 50 parts by weight per 100 parts by weight of the polyol used in the production of the polyurethane composition. When water is employed as the blowing agent, it is present in the amount of from 0.1 to 10 parts by weight per 100 parts by weight of the polyether polyol. Halogenated hydrocarbon blowing agents for use in the production of a foamed polyurethane composition are discussed in U.S. Pat. No. 3,072,582.

When it is desired to practice our invention in producing a floor coating or sealant, it is often desirable to include therein a polyhydric cross-linking agent. Such cross-linking agents include, but are not limited to polyhydric alcohols such as glycerol, trimethylolpropane, 1,2,6-hexanetriol or pentaerythritol, or amines such as ethylenediamine, N,N,N',N'-tetrahydroxypropylethylenediamine, and the like. These are included in the polyurethane composition such that they make up from about 0.02 wt. % to about 10 wt. % based upon the entire polyurethane composition. The use of such cross-linking agents are well-known and those skilled in the art will be able to readily determine the amount and type of cross-linking for use in order to achieve desired physical properties.

The chain-extending agent of our invention as described above is used in both solid polyurethane compositions and the self-skinning flexible or semi-flexible polyurethane foam composition. The amount of the chain-extending agent may be as low as 0.1 weight percent based on the polyol component in a solid elastomer polyurethane composition to about 50 weight percent of the entire formulation when used in the self-skinning foam polyurethane composition. It may be used either alone as the chain-extending agent or in conjunction with known chain-extending agents such as 1,4-butanediol, diethylene glycol, 4,4'-methylene bis(2-chloroaniline), and the like. However, we have discovered that whether used alone or in conjunction with known chain-extending agents, the chain-extender of our invention improves the tensile strength of the resulting polyurethane composition without detriment to other desired physical properties. When used in solid polyurethane compositions, the amount of 0.1 weight percent to about 15 weight percent, based upon the weight of the polyether polyol, and more preferably from about 0.5 to about 7 weight percent is employed.

In the production of the cellular self-skinning polyurethane compositions, the chain-extending agent used in the practice of our invention would be present in the amounts of from 10 weight percent to about 50 weight percent of the polyurethane reaction mixture, with preferred amounts being from about 15 weight percent to about 35 weight percent.

The chain-extender may be incorporated in the polyurethane compositions of our invention which are produced by either "one-shot" or prepolymer methods. In the "one-shot" system all the reactants and additives are mixed and reacted simultaneously. In the prepolymer system a portion of a polyhydroxy compound is reacted with the organic polyisocyanate to form a reaction product which has unreacted isocyanate groups. This reaction product is then mixed and reacted with the rest of the polymeric polyhydroxy compound to form the polyurethane composition.

In reacting the polymeric polyhydroxy compound with the organic polyisocyanate, the ratio of isocyanate groups to hydroxyl groups is between about 0.8 to about 1.5. This ratio, called the isocyanate index, is preferably between 0.9 and about 1.3 for the solid polyurethane composition and 0.8 to about 1.3 for the cellular self-skinning product. An especially preferred range for both polyurethane compositions is from about 0.95 to about 1.2. An isocyanate index of about 1.0 has been found to give very good products.

The following examples will more particularly illustrate our invention and should be considered for purposes of illustration only and not limitation thereof.

EXAMPLE I

To a 3000 ml, round-bottomed flask fitted with a mechanical stirrer, thermometer, condenser, and $N_2$ inlet and exit bubbler was added 1162.8 g of a diamine (meq/g=1.72) derived by aminating the ~3 mole propylene oxide adduct of Polymeg ® 650 diol*. The amine** was heated under a $N_2$ purge to 55° C. and 163.0 g (1.0 mole) of isatoic anhydride (IA) added spoonwise, over the temperature range of 55°–88° C. and over a 13 minute period. At 96°–97° C. and a few minutes after the 1st mole of IA was added, the addition of the second mole of IA began (163.0 g, 1.0 mole) and took 14 minutes to add at 96°–103° C. The reaction mixture was heated to 120° C. and held there for one hour and heated further to 130° C. and held there for 1 hour and then slowly heated to 153° C. maximum temperature over another 1 hour period. The product was a brown (clear) viscous liquid at room temperature weighing 1394.6 g (1400.8 g theory for a 2 mole $CO_2$ loss). The total amine content of the product was 1.36 meq/g and the spectral data support the aromatic amine-amide structure as follows:

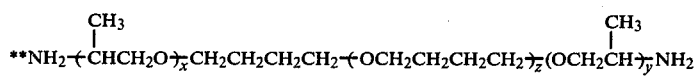

where $z = \sim 8$ and $x + y = 3$
*$H-(OCH_2CH_2CH_2CH_2)_zOH$ where $z = \sim 9$

**$NH_2-(CHCH_2O)_x-CH_2CH_2CH_2CH_2-(OCH_2CH_2CH_2CH_2)_z-(OCH_2CH)_y-NH_2$ with $CH_3$ groups where $z = \sim 8$ and $x + y = 3$.

EXAMPLE II

As described above in Example 1, 816.4 g (2.0 moles) of a diamine (meq/g=4.90 total amine) derived by aminating the 4.5 mole propylene oxide adduct of 1,6-hexandiol was heated to 85° C. under a $N_2$ purge and the first mole of IA added at ~90° C. (added 163 g, 1.0 mole IA) over an 18-minute period. The second mole of IA was added over a 10-minute period and at 90°–98° C. At 95° C., the 3rd and 4th moles of IA were added (326 g, 2.0 moles) over a 13-minute period within the temp. range of 95°–120° C. The reaction mixture was heated from 120°–150° C. (20 minutes) and held at 150° C. for 90 minutes (until no further $CO_2$ evolution noted). The product was a clear brown viscous liquid weighing 1301 g (theory=1292.4 g for loss of 4 moles $CO_2$). The product had a total amine content of 2.90 meq/g and the spectral data supported the aromatic amine-amide structure as follows:

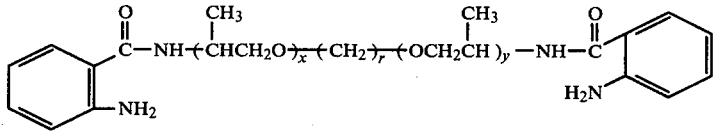

where $x + y = 4.5$ and $r = 6$.

EXAMPLE III

As described above in Example II, 1010.1 g of diamine (1.5 moles) derived by aminating the 8.5 mole propylene oxide adduct of 1,6-hexane diol was added to a flask and heated to 85° C. Isatoic anhydride (489 g, 3.0 moles) was added over a 1-hour and 25-minute period (85°–110° C.). The reaction mixture was heated to 150° C. after the addition of isatoic anhydride was complete and held there at 150° C. for 2 hours. The product was a clear, brown, viscous liquid weighing 1372.0 g (theory =1367.1 g for a 3 mole $CO_2$ loss). The product had a total amine content of 2.07 meq/g and the NMR, IR, and GPC data all support the aromatic amine-amide structure which was as in Example II with the exception that $x + y = 8.5$.

EXAMPLE IV

As described above in Example I, 204.1 g (0.52 moles) of a diamine (meq/g=5.1 total amine, mole wt. of 392 g/g. mole) derived by aminating the 4.5 mole propylene oxide adduct of 1,6-hexanediol was heated to 115° C. under a $N_2$ purge and 84.5 g isatoic anhydride (0.52 moles) added portion-wide over a 15 minute period. After addition was complete, the reaction mixture was heated to 150° C. and held there for 2 hours. The product upon cooling was a clear, brown, viscous liquid weighing 267.3 g. Theory was 265.7 g, assuming the loss of 0.52 mole $CO_2$, the product being an amide with both aliphatic and aromatic amine groups. The product had total amine content of 3.52 meq/g and the spectral data supported the amide structure possessing both aliphatic and aromatic amine groups.

EXAMPLE V

To a 500 ml flask fitted with mechanical stirrer, Friedrich condenser, thermometer, nitrogen inlet and bubbler was added 100.0 g of the tetramine derived by aminating the 16 mole propylene oxide adduct of pentaerythritol. The starting tetramine had a total amine content of 3.61 meq/g. Then to 100.0 g of tetramine (0.09 mole or 0.36 equivalents) was added 58.7 g (0.36 moles or 0.36 equivalents) of isotoic anhydride at 120°–130° C. After the spoonwise addition of isatoic anhydride was complete, the reaction mixture was heated to 155° C. and held there for approximately 1—1¼ hr. The $N_2$ pad or purge was kept on the system at all times. The product aromatic amine-amide weighed 141.0 g. Theory (for 0.36 mole $CO_2$ evolution) for the products was 142.9 g. Total amine content of the product was 2.39 meq/g. Tert. Amine contact of the product was 0.08 meq/g.

EXAMPLE VI

This example was run as described above in Example VI except that only 29.3 g (0.18 moles) of isatoic anhydride was added spoonwise to 100.0 g of tetramine at 120°–130° C. under $N_2$ pad. The product aromatic amine amide with aliphatic amine groups present was a very viscous but pourable liquid at room temperature, weighing 122.0 g (Theory=121.4 g). Total Amine content was 2.69 meq/g. Tert. Amine content was 0.118 meq/g.

EXAMPLE VII

A number of flexible foams may be prepared from the following formulations outlined in Table I below.

TABLE I

| Foam No. | 1 | 2 | 3 |
|---|---|---|---|
| Formulation, pbw. | | | |
| THANOL-F3520[1] | 100. | 100. | 100. |
| Chain-extender | — | 10[2] | 10[5] |
| Water | 4.0 | 4.0 | 4.0 |
| L-520 silicone | 1.0 | 1.0 | 1.0 |
| THERMOLITE T-10 catalyst[3] | 0.5 | 0.5 | 0.5 |
| DABCO 33LV[4] | 0.3 | 0.3 | 0.3 |
| Toluene diisocyanate | 48.4 | 48.5 | 49.2 |
| Isocyanate index | 1.05 | 0.05 | 1.05 |

[1]3500 molecular weight glycerin-based triol available from Jefferson Chemical Co.
[2]Example I compound.
[3]50% stannous octoate in dioctyl phthalate available from Metal and Thermit.
[4]33% triethylenediamine in dipropyleneglycol available from Air Products.
[5]Example II compound.

Foams from the above formulations can then be prepared. Foam properties such as tensile and tear strengths, elongation, and compression set are markedly improved utilizing the chain-extenders of the invention.

The compositions of the invention are also useful as curing agents in epoxy resin formulations, and in addition are useful in a variety of end-uses where amines and/or amides may be employed.

We claim:

1. A polyurethane composition prepared by reacting an organic polyisocyanate with a polymeric polyhydroxy compound and a chain-extending agent having the following structural formula:

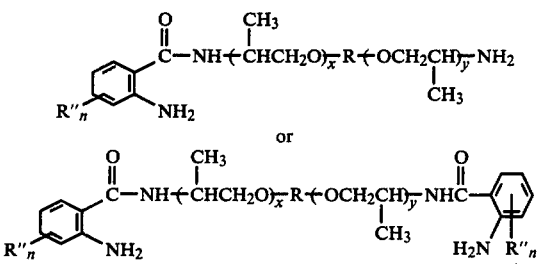

where R" is selected from a group consisting of hydrogen, alkyl, nitro, halo, hydroxy, amine and cyano and n is a number of from 1 to 4, and R is

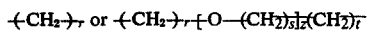

where x and y are numbers from 1 to 10, r, s, and t, are numbers of from 1 to 6 and z is a number of from 4 to 50.

2. The polyurethane of claim 1 wherein R" is hydrogen.

* * * * *